United States Patent [19]
Albert

[11] Patent Number: 5,540,469
[45] Date of Patent: Jul. 30, 1996

[54] ANIMAL WASTE COLLECTING DEVICE

[76] Inventor: Larry L. Albert, 810 N. Shore Dr., Anna Maria, Fla. 34216

[21] Appl. No.: 372,979

[22] Filed: Jan. 17, 1995

[51] Int. Cl.⁶ .............................. A01K 29/00; E01H 1/12
[52] U.S. Cl. ................. 294/1.4; 294/1.3; 294/55
[58] Field of Search ................... 294/1.3–1.5, 2, 294/55; 119/161, 795; 15/257.1, 277.4

[56] References Cited

U.S. PATENT DOCUMENTS

| | | | |
|---|---|---|---|
| 3,744,453 | 7/1973 | Deitch | 294/1.5 |
| 3,804,448 | 4/1974 | Schmieler | 294/1.4 |
| 3,942,831 | 3/1976 | Sosnove | 294/1.4 |
| 4,146,260 | 3/1979 | Carrington | 294/1.5 |
| 4,878,703 | 11/1989 | Yoshioka | 294/1.5 |
| 5,174,620 | 12/1992 | Huegelmeyer et al. | 294/1.3 |

FOREIGN PATENT DOCUMENTS

| | | | |
|---|---|---|---|
| 2650608 | 2/1991 | France | 294/1.4 |
| 93/13268 | 7/1993 | WIPO | 294/1.4 |

*Primary Examiner*—Dean Kramer
*Attorney, Agent, or Firm*—Charles J. Prescott

[57] ABSTRACT

An animal waste collecting device in combination with a disposable flexible bag and other structural features. The device includes a hollow frame having an open forwardly facing end for receiving the bag. The open end of the bag is wrapped or folded around the open end of the frame and securable as by an elastic band to protect the frame open end from coming in contact with the animal waste being scooped into the bag. The frame also includes one or more structural features for supportively receiving a flashlight aimed in the same direction as the frame open end, providing a cavity for receiving a retractable pet leash assembly and providing a leash hand loop securing post. The flashlight support also serves as a carrying handle. When secured within the mating frame cavity provided, the retractable leash assembly is fully functional, including its carrying handle.

9 Claims, 2 Drawing Sheets

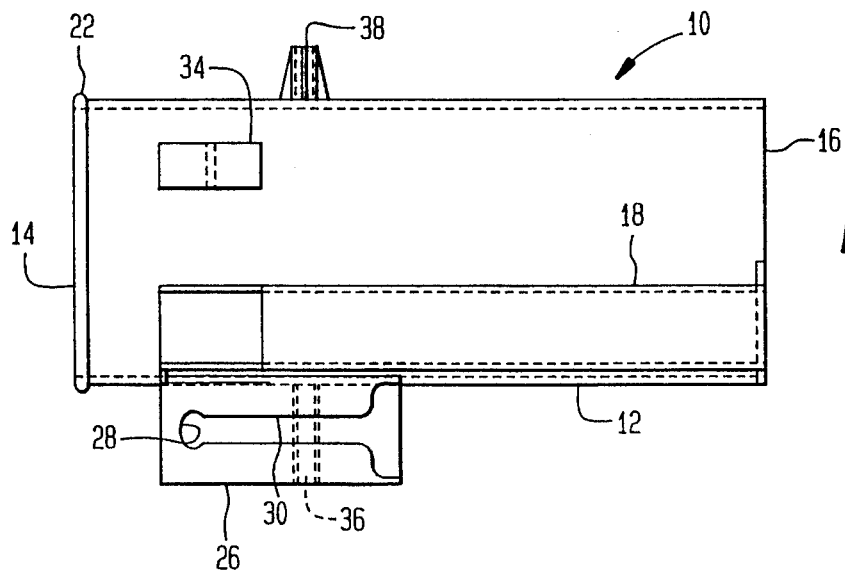
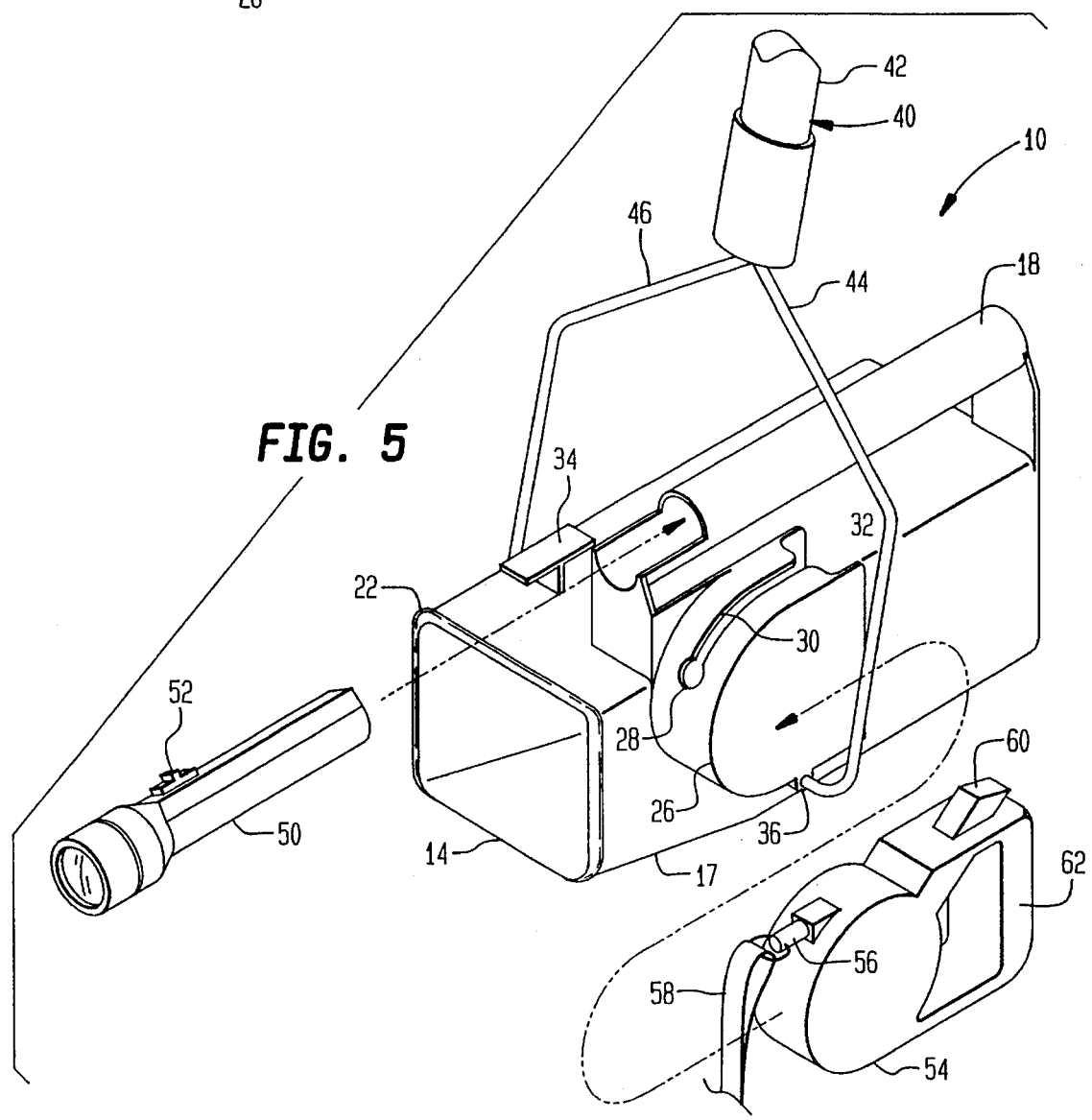

ANIMAL WASTE COLLECTING DEVICE

BACKGROUND OF THE INVENTION

1. Scope of Invention

This invention relates generally to devices and systems for collecting waste material and more particularly to a potable multi-function device for collecting animal waste such as from a dog and the like.

2. Prior Art

It is now widely accepted that those who keep animals such as dogs and the like which routinely require outside walks for bodily functions be required to pick up and remove all excrement from public areas. Failure to clean up all dog leavings in urban and residential areas, for example, is likely to be subject to fines and penalties.

One such device has been invented by Huegelmeyer as disclosed in U.S. Pat. No. 5,174,620 teaching an openable container for collecting and carrying dog animal feces in combination with an integral retractable/extendable dog leash.

In U.S. Pat. No. 4,896,912, Parnell has invented an apparatus for animal waste collection and disposal which teaches the combination of a long-handled scoop, a long-handled scraper and a supply of disposable bags all connected to a caring ring.

A number of other prior a devices are disclosed which teach the combination of a disposable flexible bag and an one or more implements facilitating depositing the waste material into the flexible bag for disposal as follows:

| | |
|---|---|
| Lemler | 3,703,158 |
| Yonaites, et al. | 3,739,418 |
| Fleishman | 3,841,684 |
| Allan, et al. | 3,971,503 |
| Krogstad, et al. | 3,986,744 |
| Niece | 4,019,768 |
| Thompson | 4,103,952 |
| Larsson | 4,132,442 |
| Mathis | 4,205,869 |
| Naderi, et al. | 4,215,886 |
| Schadler | Des.262,943 |
| Haber, et al. | 4,752,093 |
| Grahn | 4,974,893 |
| Campbell | 5,358,295 |

The present invention provides a unique multi-feature animal waste collecting device which not only allows the easy scooping of animal waste material into a disposable flexible bag fitted within its hollow housing, but also provides the features of supportively receiving a removable flash light aimed in the same general direction that a user would both walk and require light for excrement clean up while also providing an integral handle formed of the flashlight receptacle and a separate cavity removable receiving a retractable dog-walking leash assembly.

BRIEF SUMMARY OF THE INVENTION

This invention is directed to an animal waste collecting device in combination with a disposable flexible bag and other structural features. The device includes a hollow frame having an open forwardly facing end for receiving the bag. The open end of the bag is wrapped or folded around the open end of the frame and securable as by an elastic band to protect the frame open end from coming in contact with the animal waste being scooped into the bag. The frame also includes one or more structural features for supportively receiving a flashlight aimed in the same direction as the frame open end, providing a cavity for receiving a retractable pet leash assembly and providing a leash hand loop securing post. The flashlight support also serves as a carrying handle. When secured within the mating frame cavity provided, the retractable leash assembly is fully functional, including its carrying handle.

It is therefore an object of this invention to provide a multi-function animal waste collecting device which not only facilitates collecting animal excrement into a disposable bag, but also provides a flashlight receptacle usefully aimed and a means for removably operably supporting a removable retractable dog leash assembly.

It is yet another object of this invention to provide a one-hand holdable device which will not only support a retractable leash and a flashlight for walking at night, but will also be ready for collecting and removing dog feces during a walk.

It is yet another object of this invention to provide an animal waste collecting device which will supportively receive a retractable leash assembly and allow for the carrying of the device by operably hand gripping the retractable leash assembly.

It is yet another object of this invention to provide an animal waste collecting device which will removably receive a conventional flashlight.

It is yet another object of this invention to provide an animal waste collecting device which will removably receive and support a retractable dog walking leash assembly.

In accordance with these and other objects which will become apparent hereinafter, the instant invention will now be described with reference to the accompanying drawings.

BRIEF DESCRIPTION OF THE DRAWINGS

FIG. 4 is a top plan view of FIG. 1.

FIG. 5 is a perspective view of the invention shown in FIG. 1 with the addition of an elongated carrying handle, a removable flashlight and a removable retractable dog walking leash assembly.

DETAILED DESCRIPTION OF THE INVENTION

Figure 1:
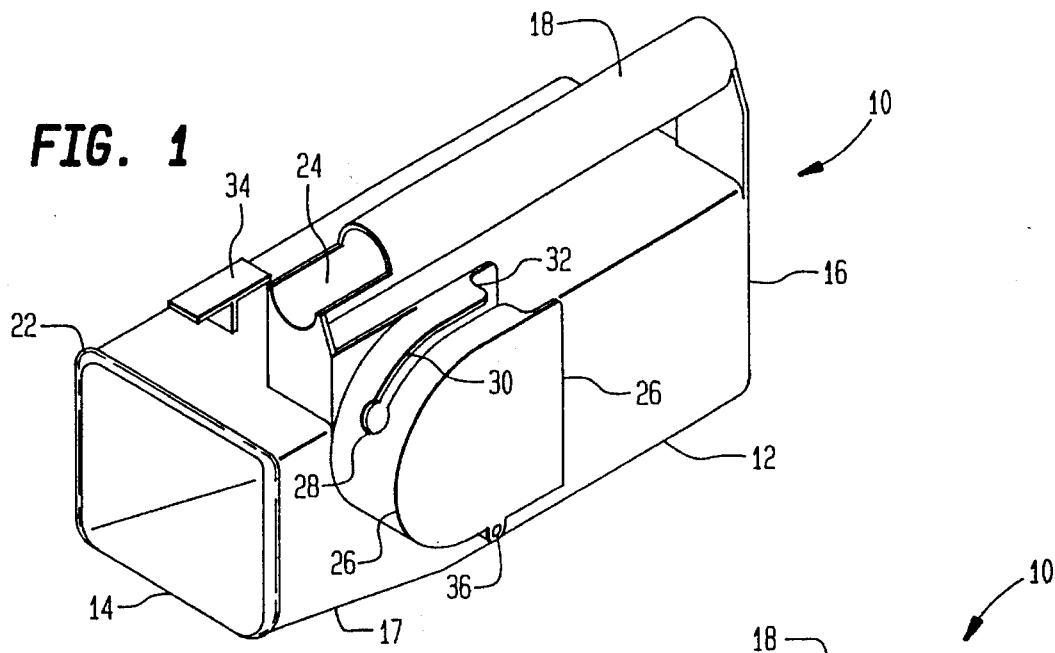
FIG. 1 is a perspective view of the invention.

Referring now to the drawings, the invention is shown generally at numeral 10 and includes a rigid molded plastic hollow frame 12 having a front opening 14 and an open rear end 16. The lower or bottom surface of frame 12 is upwardly inclined at 17 toward the front opening 14 so as to define a more effective scooping structure.

Figure 2:
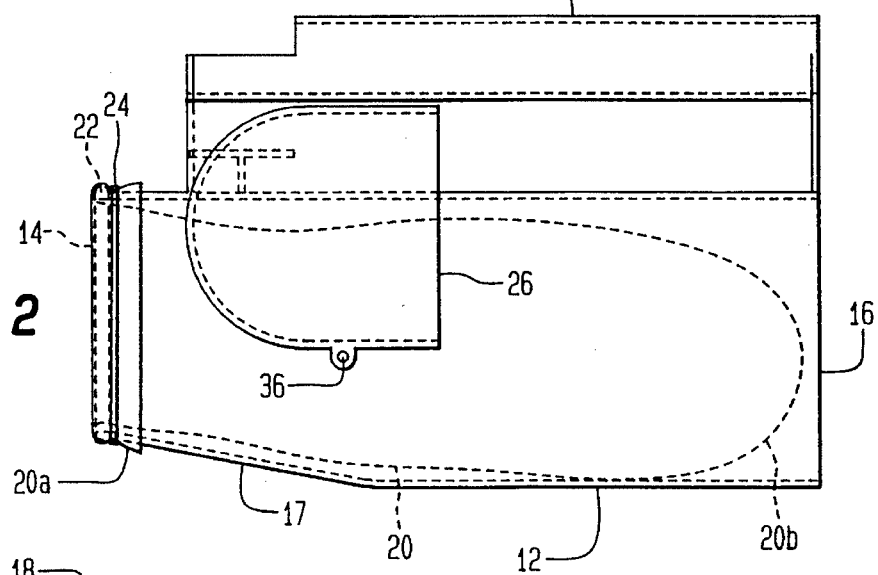
FIG. 2 is a left side elevation view of FIG. 1

A disposable flexible plastic bag 20 shown mostly in hidden lines in FIG. 2 is positionable within frame 12 as shown. The bottom portion 20b of the bag 20 extends almost to the open rear end 16 with the open end or mouth 20a of the flexible bag 20 positionable around the front opening 14 and against the outer surface of the frame 12 seen in FIG. 2 and retained in that position by an elastic band 24. The elastic band 24 is held in position spaced slightly from the open end 14 by a molded outwardly extending bead 22 formed transversely across the upper edge of opening 14 and downwardly along either side of opening 14. When so positioned, the mouth 20a of the flexible bag 20 thus protects the opening 14 from coming in contact with the animal excrement as it is scooped into the bag 20. Open rear end 16 facilitates positioning the bag 20 fully within frame 12 as shown.

Figure 3:
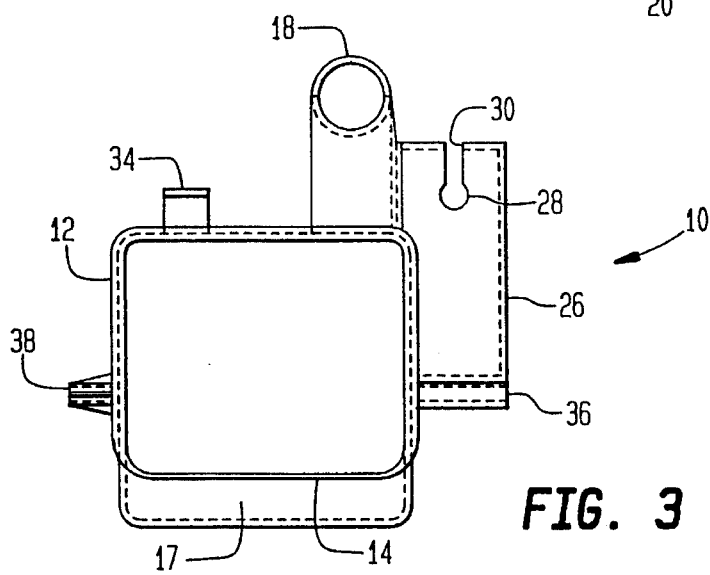
FIG. 3 is a front elevation view of FIG. 1.

An elongated longitudinally disposed tubular member 18 is integrally molded and positioned above the frame 12. This tubular member 18 is sized in diameter and length so as to supportively receive the shank of a conventional flashlight 50 inserted thereinto as shown in FIG. 5. A notch or opening 24 is provided so as to facilitate access to the on/off switch 52 of the flashlight 50. When thusly positioned within the tubular member 18, the flashlight 50 is aimed in the same general direction as that of open front end 14. Tubular member 18 also serves as a carrying handle as it is positioned above the upper surface of frame 12 for finger clearance as best seen in FIGS. 2 and 3.

A molded cavity or pocket 26 is also provided which is structured to supportively receive a conventional retractable and extendable dog walking leash assembly 54 as seen in FIG. 5. The rearwardly opening contoured cavity 26 is shaped similar to that of a wellknown retractable leash made in Germany and distributed in the United States under the trademark STANDARD FLEXI 2-5, although the shape of cavity 26 is easily modifiable to adapt to virtually any such similar type retractable dog walking leash assembly.

The cavity 26 includes an elongated slot 30 having an enlarged bottom end 28 and an enlarged opening 32 which operably receives the enlarged end 56 and looped end 58 along with the leash-extend brake control 60. When inserted into the cavity 26 in the direction of the arrow in FIG. 5, the retractable leash assembly 54 is not only fully operational and functional in all respects, but also may be grasped by its handle 62 so that the user may carry the entire combination in that manner alone without relying upon the tubular member 18 as previously described.

When the user wishes to utilize a conventional animal walking leash (not shown) with a looped upper end thereof which is normally held around the wrist, a tee-shaped securing post 34 will releasably receive the upper looped end of the leash for securement.

Although the device 10 is preferably carried by tubular handle 18 when serving as both a leash and a feces scoop, a separate elongated detachable handle 40 is also provided. This detachable handle 40 includes an elongated straight rigid member 42 sized in length so as to be hand-grasped at its upper distal end by an upright user who is able to position and operate the device 10 at ground level. A two-part rigid wire frame 44/46 pivotally engages within molded bosses 36 and 38 so that the frame 12 will freely pivot about the transverse axis passing through bosses 36 and 38. By pressing the detachable handle downward toward the ground, bottom surface 17 will be positioned against and easily slide along the ground or grassy area to facilitate scooping the feces into the disposable bag 20.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An animal waste collecting device comprising:

a hollow frame having an open end thereof to define a scoop, said frame being sized to receive a disposable flexible bag positionable therein;

a means for retaining an open end of the bag releasably secured around and preventing said open end from coming in contact with animal waste when being scooped into the bag;

a combination carrying handle and flashlight support sized to supportively receive an elongated portable flashlight inserted therewithin whereby the flashlight may be releasably secured and operably positioned and aimed in a direction similar to that of said open end.

2. An animal waste collecting device as set forth in claim 1, further comprising:

elongated detachable handle means pivotally connectable at a lower end thereof to said frame about a transverse axis of said frame enabling an upright user to operably support said device at ground level while holding and manipulating an upper end of said handle means.

3. An animal waste collecting device as set forth in claim 2, further comprising:

means connected in close proximity to an exterior surface of said frame for connecting a looped end of a conventional pet walking leash thereto.

4. An animal waste collecting device comprising:

a hollow frame having an open forwardly facing end thereof, said frame sized to receive a disposable flexible bag positionable within said frame through said open end;

retaining means for releasably securing an open end of the bag protectively positioned around said open end;

leash assembly support means connected in close proximity to an exterior side surface of said frame for supportively and operably receiving a retractable pet walking leash assembly, the leash assembly having a housing with a separate handle and an automatically extendable and retractable leash, the distal end of which is connectable to an animal collar.

5. An animal waste collecting device as set forth in claim 4, further comprising:

elongated detachable handle means pivotally connectable at a lower end thereof to said frame about a transverse axis of said frame enabling an upright user to operably support said device at ground level while holding and manipulating an upper end of said handle means.

6. An animal waste collecting device as set forth in claim 5, further comprising:

means connected in close proximity to an exterior surface of said frame for connecting a looped end of a conventional pet walking leash thereto.

7. An animal waste collecting device comprising:

hollow frame means for supportively receiving through an open end thereof a disposable flexible bag positionable therewithin;

means for retaining an open end of said bag protectively folded around said frame means open end;

means connected to a top surface of said frame means for supportively receiving an elongated flashlight longitudinally oriented with and forwardly aimed with respect to said frame means;

leash support means connected to an exterior side surface of said frame means for supportively and operably receiving a retractable pet walking leash assembly, the leash assembly being operably holdable by a user when positioned within said leash support means.

8. An animal waste collecting device as set forth in claim 7, further comprising:

elongated detachable handle means pivotally connectable at a lower end thereof to said frame means about a transverse axis of said frame means enabling an upright user to operably support said device at ground level while holding and manipulating an upper end of said handle means.

9. An animal waste collecting device as set forth in claim 8, further comprising:

means connected to an exterior surface of said frame means for connecting a looped end of a conventional pet walking leash thereto.

* * * * *